No. 694,055. Patented Feb. 25, 1902.
W. C. ELSEY.
COTTON CHOPPER AND CULTIVATOR.
(Application filed July 27, 1901.)
(No Model.) 3 Sheets—Sheet 1.
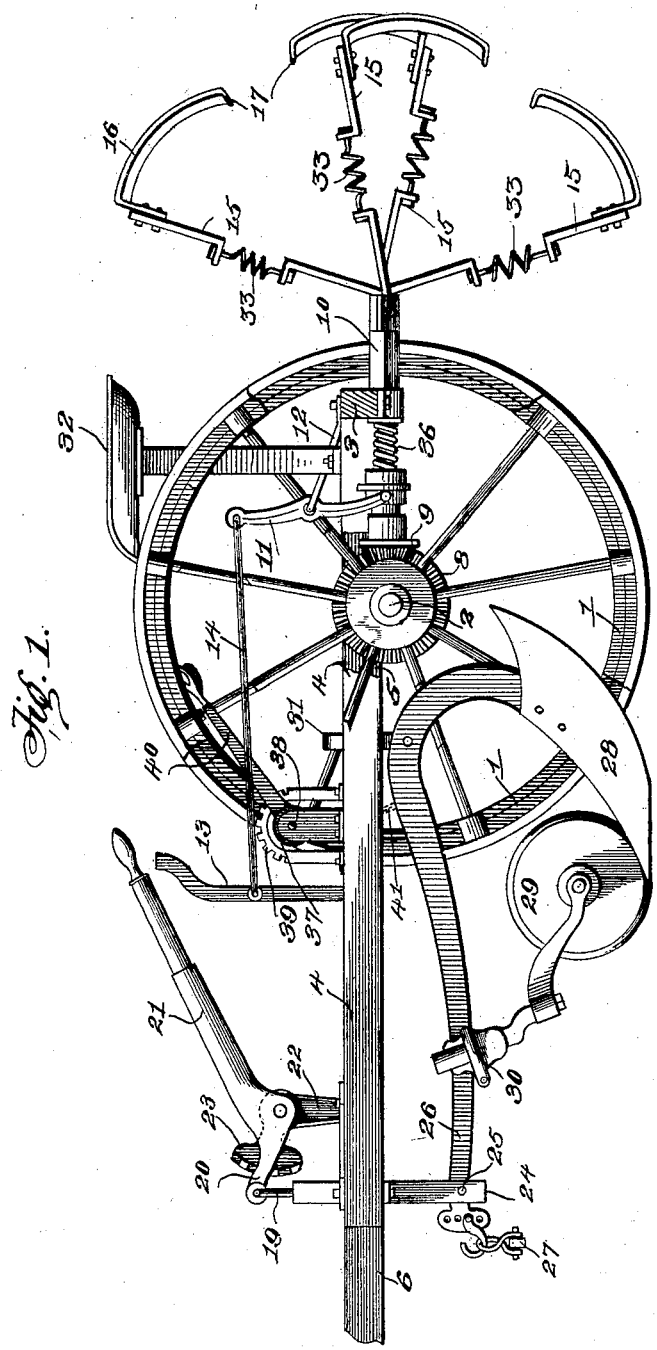
Witnesses
Inventor
William C. Elsey,

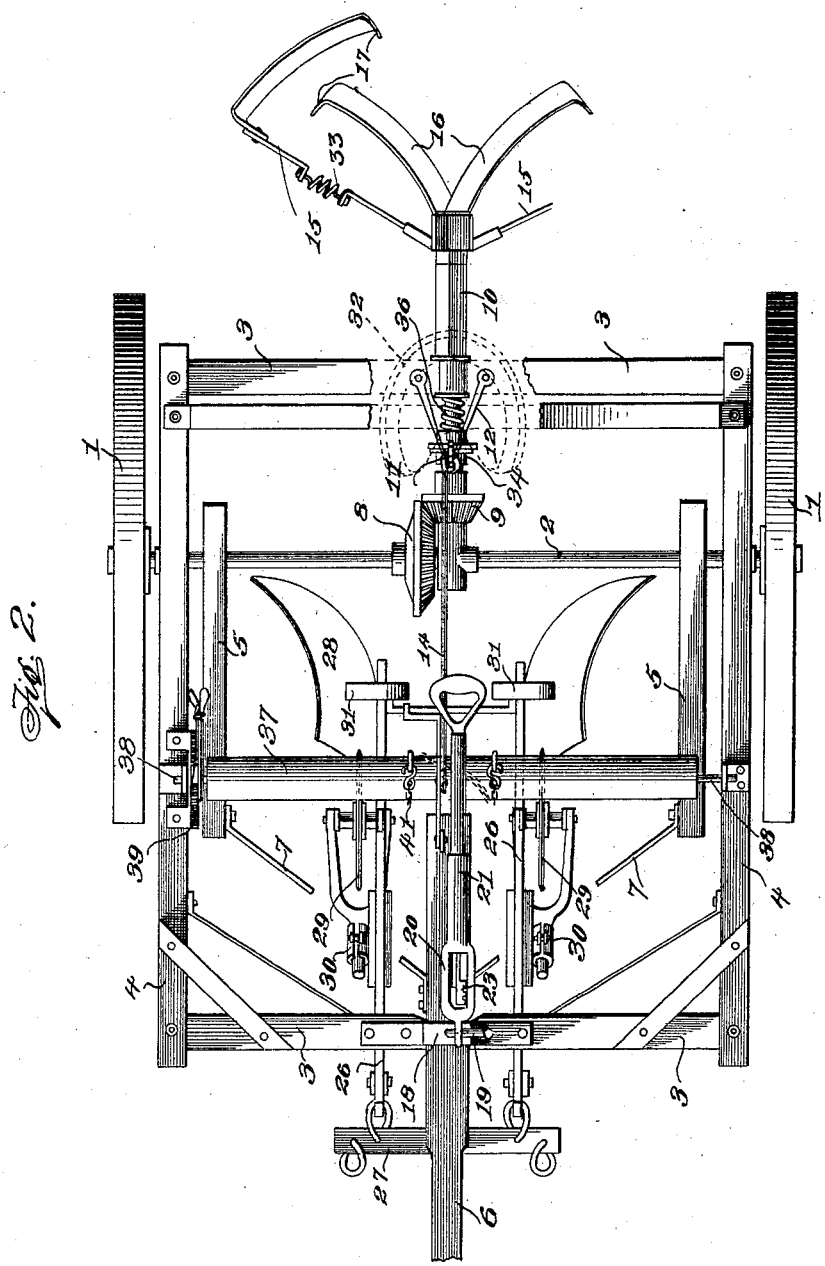

No. 694,055.  
W. C. ELSEY.  
COTTON CHOPPER AND CULTIVATOR.  
(Application filed July 27, 1901.)  
(No Model.)  
Patented Feb. 25, 1902.  
3 Sheets—Sheet 3.
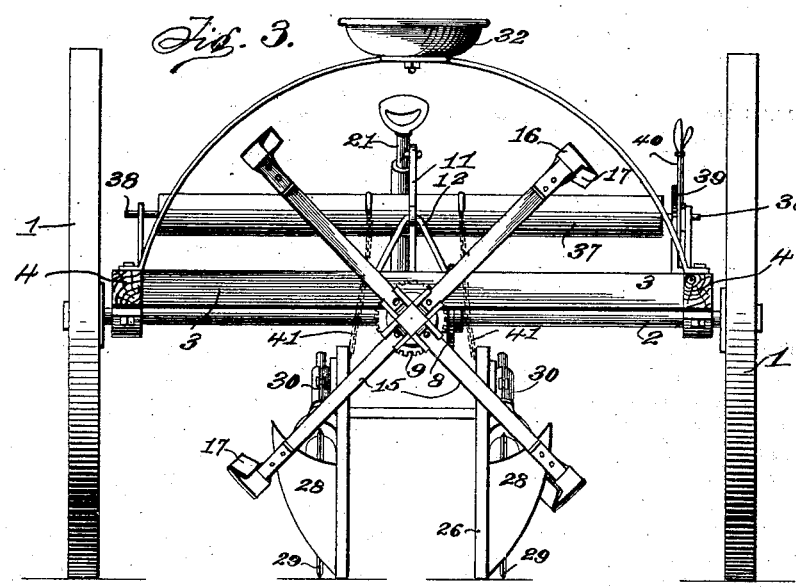
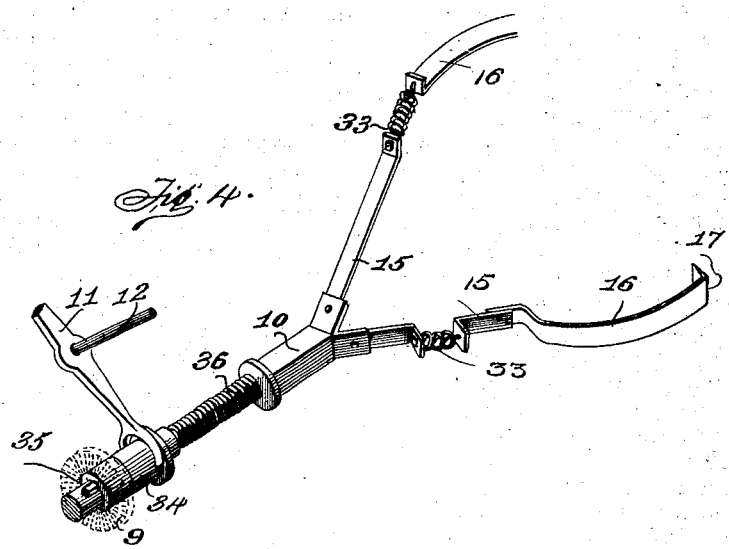
Witnesses  
G. H. Walmsley  
Harry A. Wild
Inventor  
William C. Elsey,  
W. J. Fitzgerald  
Attorneys.

United States Patent Office.

WILLIAM C. ELSEY, OF AURORA, MISSOURI.

COTTON CHOPPER AND CULTIVATOR.

SPECIFICATION forming part of Letters Patent No. 694,055, dated February 25, 1902.

Application filed July 27, 1901. Serial No. 69,919. (No model.)

*To all whom it may concern:*

Be it known that I, WILLIAM C. ELSEY, a citizen of the United States, residing at Aurora, in the county of Lawrence and State of Missouri, have invented certain new and useful Improvements in Cotton Choppers and Cultivators; and I do hereby declare the following to be a full, clear, and exact description of the invention, such as will enable others skilled in the art to which it appertains to make and use the same.

My invention relates to a combined cotton chopper and cultivator; and it consists of certain novel features of combination and construction of parts, the preferred materialization of which will be fully set forth in the following specification and illustrated in the accompanying drawings.

The prime object of my invention is to provide a cotton chopper and cultivator which may be freely drawn over the ground and which may be so adjusted that it will reliably perform its office of removing a surplus of the cotton-plants and destroying weeds, grass, or the like growing therewith.

Referring to the drawings, Figure 1 is a side elevation, partly in section, of my invention complete ready for use. Fig. 2 is a top plan view thereof, illustrating the seat by dotted lines. Fig. 3 is a rear elevation of my improved cotton-chopper, while Fig. 4 is a perspective view illustrating the knife-shaft.

In materializing my invention I provide the carrying-wheels 1, having the axle or shaft 2, upon which the framework of my improved cotton-chopper is mounted, said framework comprising the end sections 3 and the side members 4, said side members being provided with suitable bearings, in which a contiguous part of the axle 2 is journaled. I also provide the auxiliary frame-sections 5, which are provided upon their rear ends with an aperture adapted to afford a bearing-seat for a contiguous part of the axle extending therethrough, while the forward ends of said sections are connected directly with the tongue 6 by means of the braces 7. To the axle 2 I rigidly secure the driving-gear 8, designed to mesh with the beveled gear 9, carried upon the shaft 10, in such a manner that it may be readily moved in and out of mesh with the gear 8 by means of the controlling-lever 11, properly held in position by the bracket 12 and controlled by the foot-lever 13, which latter is connected to the lever 11 by the link-section 14, as more clearly shown in Fig. 1. To the rear end of the shaft 10 I secure, in any preferred way, a plurality of radiating arms 15, each of which is provided with the longitudinally-curved cutting-blade 16, having the laterally-extending terminal 17, and it is obvious that when the shaft 10 is rapidly rotated and the machine drawn over the ground said knives will successively engage the surface of the soil and remove surplus cotton-plants or destroy grasses, weeds, or the like.

The middle portion of the end section 3 is removed sufficiently to permit the upward or downward play or movement of the tongue 6, and in order that the ends of the divided section 3 may be secured in place I provide the yoke 18, which extends upwardly above the section 3 and has attached thereto the upwardly-extending bracket or eyebolt 19, which is pivotally attached to the forwardly-extending branch 20 of the controlling-lever 21, which latter is pivoted in position upon the bracket 22, attached to a contiguous part of the tongue.

In order to hold the lever 21 in an adjusted position, I integrally form with or otherwise secure to the bracket 22 the rack-bar 23 and provide upon the lever 21 a suitable detent to engage the teeth of said rack-bar, and thereby hold the lever in an adjusted position. By means of the lever 21 I am therefore enabled to relatively adjust the tongue and the main frame-section, and thereby lift the rear end of said frame-section or depress it, as desired, and incidentally raise and lower the shaft 10 and the cutting-blades carried thereby. I also provide upon the under side of the forward section 3 the depending brackets 24, there being two of said brackets, connected by the rod 25, which latter is designed to limit the downward movement of the plow-beam 26, to the forward end of which the draft-animals are attached, as by means of the singletree 27 or otherwise.

The plow shovel or share 28 may be of any preferred construction and is preferably provided with the rolling colter-knife 29, attached to the beam by the clamp 30. Each of the plow-beams is also provided with the foot controlling-levers 31, whereby the operator occupying the seat 32, located upon the frame, may laterally move said plows or shovels as desired during the operation of the machine.

The knives or cutting-blades 16 are preferably adjustably mounted upon the radial arms 15, as by means of bolts or the equivalent thereof, and in order that the knives may be mounted so that they will yieldingly move away from a root or other solid object I provide the intervening resilient section, formed of a heavy coiled spring 33, as illustrated in detail in Fig. 4, and it is obvious that the knife may strike some solid object and yet be less liable to injury than would be the case if the blade were rigidly mounted in place upon the arm 15.

The gear-wheel 9 is provided with the sleeve 34, said sleeve being designed to move longitudinally upon the shaft 10, but forced to rotate therewith by means of the key 35, the sleeve 34 and its accompanying gear 9 being normally held in such position that said gear will be in mesh with the gear 8 by means of the spring 36, coiled around a contiguous part of the shaft 10, as will be obvious by reference to the drawings.

In order that the cutting depth of the shovels or shares 28 may be easily regulated or controlled, I provide the adjustable roller 37, having the journals 38, which are mounted in suitable bearings upon the side sections 4. I also provide upon one of the side sections 4 the segmental rack-bar 39, designed to coöperate with the controlling-lever 40, provided with a suitable detent adapted to engage the teeth upon the bar 39, and as each of the plows is connected to the roller 37, as by means of the chains 41, it is obvious that by rotating or partly rotating said roller 37 the chains may be wound thereon, and thereby elevate the plows or permit the same to be lowered, as desired, by the operator.

After the several coöperating parts of my invention have been assembled in their respective operative positions, substantially as herein described, the machine may be drawn over the ground, which will induce the rotation of the gears 8 and 9 and the incident rotation of the shaft 10, thereby causing the knives to either deeply or lightly engage the surface of the soil, according to the adjustment of the lever 21.

The arms 15 and their accompanying knives may be increased in number, if desired. If but one or two of said knives are employed, the knives will contact with the surface only at intervals, leaving parts of the surface untouched, and thereby not disturbing portions of the row of cotton-plants, while if the knives are increased in number a less number of cotton-plants will be left standing.

My improved combined cotton chopper and cultivator will be found very desirable and useful for the purpose specified and will also be found advantageous as a cultivator of the soil, inasmuch as the surface between rows of growing plants of corn, cotton, or the like may be thoroughly agitated by the cutting-blades, thereby removing the grasses, weeds, or undesirable growth.

While I have described the preferred combination and construction of parts, it will be understood that I desire to comprehend such substantial equivalents and substitutes as may be considered to fall fairly within the scope and purview of my invention.

Having thus fully described my invention, what I claim as new, and desire to secure by Letters Patent, is—

1. In a combined cotton chopper and cultivator, the combination with a suitable frame and carrying-wheels therefor, of an auxiliary frame coöperating with the main frame and having a bearing for the contiguous part of the axle, a tongue connected to the auxiliary frame, means to regulate the relative position of said frames, a shaft rotatably mounted on the frame, means to actuate said shaft, radial arms carried by one end of said shaft and having resilient portions, knives carried by said arms, all combined substantially as specified and for the purpose set forth.

2. In a device of the character described, the combination with a shaft and an arm radiating therefrom and a longitudinally-curved cutting arm or blade carried thereby and an intervening resilient portion or section, as set forth.

3. The combination with a shaft and arms radiating therefrom and having resilient portions between their ends, of longitudinally-curved cutting-blades carried by said arms, a sleeve slidingly mounted on the shaft to rotate therewith, and a spring on said shaft acting on the sleeve, as set forth.

In testimony whereof I affix my signature in presence of two witnesses.

WILLIAM C. ELSEY.

Witnesses:
J. L. RINKER,
J. A. MELTON.